US009489482B1

(12) United States Patent
Bickford et al.

(10) Patent No.: US 9,489,482 B1
(45) Date of Patent: Nov. 8, 2016

(54) RELIABILITY-OPTIMIZED SELECTIVE VOLTAGE BINNING

(71) Applicant: International Business Machines Corporation, Armonk, NY (US)

(72) Inventors: Jeanne P. Bickford, Essex Junction, VT (US); Nazmul Habib, South Burlington, VT (US); Baozhen Li, South Burlington, VT (US); Tad J. Wilder, South Hero, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/739,436

(22) Filed: Jun. 15, 2015

(51) Int. Cl.
*G06F 9/455* (2006.01)
*G06F 17/50* (2006.01)

(52) U.S. Cl.
CPC ................... *G06F 17/5081* (2013.01)

(58) Field of Classification Search
CPC ............. G06F 17/5045; G06F 11/008; G06F 17/5009; G06F 17/5081
See application file for complete search history.

(56) References Cited

U.S. PATENT DOCUMENTS

| | | |
|---|---|---|
| 6,789,032 B2 | 9/2004 | Barbour et al. |
| 7,363,176 B2 | 4/2008 | Patel et al. |
| 7,415,387 B2 | 8/2008 | Fields et al. |
| 7,475,366 B2 | 1/2009 | Kuemerle et al. |
| 7,902,477 B1 | 3/2011 | Connolly |
| 8,082,055 B2 | 12/2011 | Lin et al. |
| 8,234,511 B2 | 7/2012 | Lopata |
| 8,719,763 B1 | 5/2014 | Bickford et al. |
| 8,943,444 B2 | 1/2015 | Bickford et al. |
| 9,058,250 B2 | 6/2015 | Bickford et al. |
| 2008/0034337 A1* | 2/2008 | Kuemerle ........... G06F 17/5045 716/134 |
| 2009/0228843 A1* | 9/2009 | Anemikos ........... G06F 17/5045 716/132 |
| 2012/0191384 A1 | 7/2012 | Kalgren et al. |

FOREIGN PATENT DOCUMENTS

| | | |
|---|---|---|
| CN | 10-2567560 A | 7/2012 |
| JP | 2011-077287 A | 4/2011 |
| WO | 2006052720 A1 | 5/2006 |

OTHER PUBLICATIONS

Shen et al., "A New Voltage Binning Technique for Yield Improvement Based on Graph Theory", IEEE, 13th International Symposium on Quality Electric Design, 2012, pp. 243-248.

* cited by examiner

*Primary Examiner* — Nha Nguyen
(74) *Attorney, Agent, or Firm* — Gibb & Riley, LLC; Steven J. Myers, Esq.

(57) ABSTRACT

Disclosed is a method for improving integrated circuit (IC) chip reliability. In the method, IC chips, which are manufactured according to a given IC chip design, are sorted into multiple different groups associated with different process windows in the process distribution for the design. Different operating voltages are assigned to the different groups, respectively, in order to optimize overall reliability of IC chips across the process distribution. That is, each group is associated with a specific process window, comprises a specific portion of the IC chips and is assigned a group-specific operating voltage that minimizes the fail rate of the specific portion of the IC chips and that, thereby optimizes the reliability of the specific portion of the IC chips. The group-specific operating voltage will be within minimum and maximum voltages associated with either the process distribution or the specific process window (e.g., following power-optimized selective voltage binning).

20 Claims, 9 Drawing Sheets

| Group Number | % of IC Chips |
|---|---|
| 15 | 0.298 |
| 14 | 0.789 |
| 13 | 1.817 |
| 12 | 3.641 |
| 11 | 6.349 |
| 10 | 9.633 |
| 9 | 12.720 |
| 8 | 14.617 |
| 7 | 14.617 |
| 6 | 12.720 |
| 5 | 9.633 |
| 4 | 6.349 |
| 3 | 3.641 |
| 2 | 1.817 |
| 1 | 0.789 |
| 0 | 0.298 |

| Group Number | % of IC Chips | Group-Specific Voltage | Group-Specific Voltage Range |
|---|---|---|---|
| 15 | 0.298 | | |
| 14 | 0.789 | | |
| 13 | 1.817 | | |
| 12 | 3.641 | | |
| 11 | 6.349 | | |
| 10 | 9.633 | | |
| 9 | 12.720 | | |
| 8 | 14.617 | | |
| 7 | 14.617 | | |
| 6 | 12.720 | | |
| 5 | 9.633 | | |
| 4 | 6.349 | | |
| 3 | 3.641 | | |
| 2 | 1.817 | | |
| 1 | 0.789 | | |
| 0 | 0.298 | | |

RELIABILITY-OPTIMIZED SELECTIVE VOLTAGE BINNING

BACKGROUND

The present invention relates to integrated circuit (IC) chip reliability and, more specifically, to a method for improving integrated circuit chip reliability through reliability-optimized selective voltage binning.

More particularly, various failure mechanisms can cause the components (e.g., devices, interconnects, etc.) of an integrated circuit (IC) chip to degrade. These failure mechanisms include, but are not limited to, time-dependent dielectric breakdown (TDDB) of the gate dielectric layer or between metal lines, hot carrier injection (HCI), negative bias temperature instability (NBTI), positive bias temperature instability (PBTI), soft error rate (SER), retention disturbance, stress migration (SM) (also referred to as stress-induced voiding (SIV)) and electromigration (EM). Over time these failure mechanisms can impact performance (e.g., operating speed) and/or lead to IC chip failure. Therefore, it would be advantageous to provide a method that minimizes the impact of such failure mechanisms in order to improve IC chip reliability.

SUMMARY

In view of the foregoing, disclosed herein are embodiments of a method for improving integrated circuit (IC) chip reliability through reliability-optimized selective voltage binning. In the embodiments, IC chips, which are manufactured according to a given IC chip design, can be sorted into different groups associated with different process windows within a process distribution for the design. Subsequently different operating voltages can be assigned to the different groups, respectively, in order to optimize overall reliability of the IC chips across the process distribution. That is, each group can be associated with one of the process windows, can comprise a specific portion of the IC chips and can be assigned a group-specific operating voltage that minimizes the group fail rate (i.e., the fail rate of the specific portion of the IC chips contained in the group) and that, thereby optimizes the reliability of the specific portion of the IC chips contained in the group (i.e., optimizes reliability across the process window). The group-specific operating voltage assigned can be within minimum and maximum voltages associated with either the process distribution or the process window associated with the group (e.g., following power-optimized selective voltage binning). Optionally, the reliability across the process distribution can be optimized by a combination of both assigning the appropriate operating voltage, as discussed above, and adjusting group size.

More particularly, disclosed is an embodiment of a method for improving integrated circuit (IC) chip reliability through reliability-optimized selective voltage binning. In this embodiment, IC chips, which are manufactured according to a given IC chip design, can be sorted into groups associated with different process windows within a process distribution for the design. Subsequently group-specific operating voltages can be assigned to the groups, respectively, in order to optimize reliability of the IC chips within the groups and, thereby optimize overall reliability of the IC chips across the full process distribution. Specifically, each group can be associated with one of the process windows, can comprise a specific portion of the IC chips and can be assigned a group-specific operating voltage. The group-specific operating voltage of a group can be assigned so that it minimizes the fail rate of the specific portion of the IC chips contained in that group and, thereby so that it optimizes the reliability of the specific portion of the IC chips contained in that group (i.e., optimizes reliability across the process window associated with that group). In this case, the group-specific operating voltages assigned to the groups can all be appropriate operating voltages within an overall operating voltage range (i.e., minimum and maximum voltages) associated with the process distribution.

Also disclosed herein is an embodiment of a method for improving integrated circuit (IC) chip reliability through reliability-optimized selective voltage binning, wherein the method is combined with power-optimized selective voltage binning. In this embodiment, IC chips, which are manufactured according to a given IC chip design, can be sorted into groups associated with different process windows within a process distribution for the design. Next, power-optimized selective voltage binning can be performed. That is, group-specific operating voltage ranges can be assigned to the groups, respectively, in order to minimize power consumption of the IC chips in each of the groups and, thereby across the full process distribution. Subsequently group-specific operating voltages can be assigned to the groups, respectively, in order to optimize reliability of the IC chips within the groups and, thereby optimize overall reliability of the IC chips across the full process distribution. Specifically, each group can be associated with one of the process windows, can comprise a specific portion of the IC chips and can be assigned a group-specific operating voltage. Each group-specific operating voltage can be assigned to a group so that it minimizes the fail rate of the specific portion of the IC chips contained in that group and, thereby so that it optimizes the reliability of the specific portion of the IC chips contained in the specific group (i.e., optimizes reliability across the process window associated with that group). In this case, the group-specific operating voltages assigned to the groups can be appropriate operating voltages within previously assigned group-specific operating voltage ranges (i.e., minimum and maximum voltages), respectively.

Also disclosed herein is an embodiment of a method for improving integrated circuit (IC) chip reliability through reliability-optimized selective voltage binning, which involves both assigning appropriate operating voltages to different groups of IC chips associated with different process windows and adjusting group size. In this embodiment, IC chips, which are manufactured according to a given IC chip design, can be sorted into groups associated with different process windows within a process distribution for the design. Subsequently group-specific operating voltages can be assigned to the groups, respectively, and group size (i.e., the different percentages of the total number (N) of the manufactured IC chips within each of the groups or, more particularly, the number (n) of IC chips within each group, where the value of n may vary from group to group) can be adjusted in order to optimize reliability of the IC chips within the groups and, thereby optimize overall reliability of the IC chips across the full process distribution. Specifically, each group can be associated with one of the process windows, can comprise a specific portion of the IC chips and can be assigned a group-specific operating voltage. Each group-specific operating voltage can be assigned to a group so that it minimizes the fail rate of the specific portion of the IC chips contained in that group and, thereby so that it optimizes the reliability of the specific portion of the IC chips contained in that group (i.e., optimizes reliability across the process window associated with that group). However, before the group-specific operating voltages are finally assigned, adjustment of the sizes of the different groups can be considered as a part of an iterative process that determines whether reliability across the process distribution can be further improved (i.e., by selectively adjusting the different percentages of the total number (N) of the manufactured IC chips within each of the groups or, more particularly, by selectively adjusting the number (n) of IC chips within each group, where the value of n may vary from group to group). In this case, the group-specific operating voltages assigned to the groups can be either appropriate operating voltages within an overall operating voltage range (i.e., minimum and maximum voltages) associated with the process distribution or, alternatively, appropriate operating voltages within previously assigned group-specific operating voltage ranges (i.e., minimum and maximum voltages), respectively.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, various failure mechanisms can cause the components (e.g., devices, interconnects, etc.) of an integrated circuit (IC) chip to degrade. These failure mechanisms include, but are not limited to, time-dependent dielectric breakdown (TDDB) of the gate dielectric layer or between metal lines, hot carrier injection (HCI), negative bias temperature instability (NBTI), positive bias temperature instability (PBTI), soft error rate (SER), retention disturbance, stress migration (SM) (also referred to as stress-induced voiding (SIV)) and electromigration (EM). Over time these failure mechanisms can impact performance (e.g., operating speed) and/or lead to IC chip failure. Therefore, it would be advantageous to provide a method that minimizes the impact of such failure mechanisms in order to improve IC chip reliability.

Reliability of an IC chip (also referred to herein as the expected useful life of the IC chip) can be defined in terms of the expected minimum amount of time or, more particularly, the expected minimum number of power-on hours (POHs) during which an IC chip can be expected, with a specified probability, to perform without fail. Reliability is typically determined as a function of the various failure mechanisms. Specifically, designers have realized that process parameter variations have a significant impact on IC chip performance (e.g., on operating speed, as indicated by delay). Such process parameter variations are due to variations that occur during manufacturing and include, but are not limited to, variations in channel length, channel width, doping, spacer width, etc. To determine reliability, reliability simulators model the various failure mechanisms in order to set the fail rates associated with those failure mechanisms across the full process distribution for the design. The full process distribution for the design refers to performance range of IC chips manufactured according to the design, given a nominal operating voltage. This performance range extends from relatively fast IC chips (e.g., $3\sigma$ fast IC chips) at one end of the process distribution (i.e., the "fast" end of the process distribution) to relatively slow IC chips (e.g., $3\sigma$ slow IC chips) at the opposite end of the process distribution (i.e., the "slow" end of the process distribution). The failure mechanism fail rates are typically defined in units of FIT (i.e., a number of failures per billion part hours) and are combined into a single fail rate for the full process distribution.

Recently, it has been found that, depending upon the failure mechanism at issue, the failure mechanism fail rate may not be constant across the full process distribution (e.g., see U.S. Pat. No. 8,943,444 of Bickford et al., issued on Jan. 27, 2015 and incorporated herein by reference). That is, when a specific failure mechanism is modeled separately for different process windows within the full process distribution, the resulting fail rates may differ for the different process windows (e.g., the fail rate for a process window at the fast end of the process distribution may be higher or lower than the fail rate for a process window at the slow end of the process distribution). For example, the BTI and HCI failure mechanisms have a higher fail rate at the slow end of the process distribution, the TDDB and EM failure mechanisms have a higher fail rate at the fast end of the process distribution, and other failure mechanisms (e.g., stress-induced voiding (SIV)) have an essentially constant fail rate across the process distribution.

In view of the foregoing, disclosed herein are embodiments of a method for improving integrated circuit (IC) chip reliability through reliability-optimized selective voltage binning. In the embodiments, IC chips, which are manufactured according to a given IC chip design, can be sorted into different groups associated with different process windows within a process distribution for the design. Subsequently different operating voltages can be assigned to the different groups, respectively, in order to optimize overall reliability of the IC chips across the process distribution. That is, each group can be associated with one of the process windows, can comprise a specific portion of the IC chips and can be assigned a group-specific operating voltage that minimizes the group fail rate (i.e., the fail rate of the specific portion of the IC chips contained in the group) and that, thereby optimizes the reliability of the specific portion of the IC chips contained in the group (i.e., optimizes reliability across the process window). The group-specific operating voltage assigned can be within minimum and maximum voltages associated with either the process distribution or the process window associated with the group (e.g., following power-optimized selective voltage binning). Optionally, the reliability across the process distribution can be optimized by a combination of both assigning the appropriate operating voltage, as discussed above, and adjusting group size.

Figure 1:
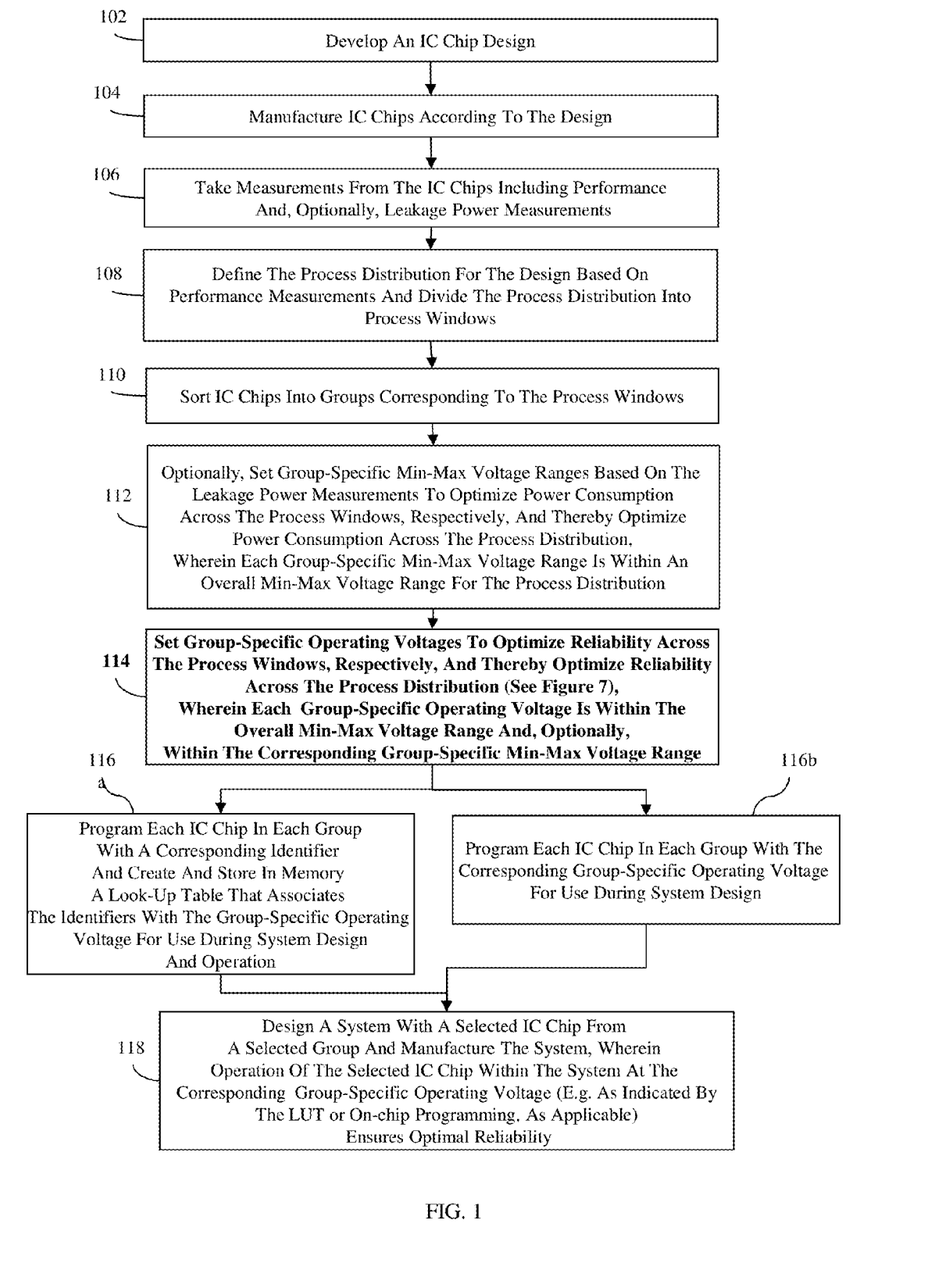
FIG. 1 is a flow diagram illustrating a method for improving integrated circuit (IC) chip reliability through reliability-optimized selective voltage binning.

More particularly, referring to FIG. 1, disclosed herein are embodiments of a method for improving integrated circuit (IC) chip reliability through reliability-optimized selective voltage binning.

In each of these embodiments, the method can comprise developing a design for an integrated circuit (IC) chip (102) and manufacturing IC chips according to that design (104). Those skilled in the art will recognize that the IC chip design developed at process 102 will set out specifications for various parameters (e.g., for channel length, channel width, doping, spacer width, etc.). However, the actual values of those parameters may vary due to manufacturing process variations and, as a result, may impact the performance (e.g., operating speed, as indicated by delay) of manufactured IC chips.

Following IC chip manufacture at process 104, various different measurements can be taken from the manufactured IC chips (106). These measurements can include, but are not limited to, performance measurements (e.g., delay measurements) and leakage power measurements. Various different techniques for measuring performance and leakage power of IC chips are well known in the art. Thus, the details of such techniques are omitted from this specification in order to allow the reader to focus on the salient aspects of the disclosed embodiments.

Additionally, the method can comprise defining the process distribution of the IC chip design (108). That is, given the condition that all IC chips are operated using the same supply voltage, the full performance range (i.e., the full process distribution) of the IC chip design can be defined from the fastest IC chips (e.g., from 3-sigma fast IC chips) relative to IC chips with a nominal operating speed to the slowest IC chips (e.g., −3-sigma slow IC chips) relative to IC chips with the nominal operating speed. This process distribution can, for example, be a Gaussian distribution. Alternatively, the process distribution can be some other statistical distribution. In any case, the process distribution for the IC design can be defined either prior to manufacturing the IC chips at process 104 (e.g., based on a best case/worst case analysis) or after manufacturing the IC chips at process 104 (e.g., based on the actual performance measurements taken from the manufactured IC chips at process 106).

One the process distribution is defined, the IC chips are manufactured and the measurements are taken, the process distribution can be divided into some number (M) of process windows (108) and the manufactured IC chips can, based on the performance measurements acquired at process 106, be sorted into the groups (e.g., M groups) that correspond to the process windows (110). Thus, each group will contain a subset of the total number (N) of IC chips manufactured at process 104.

Figure 2:
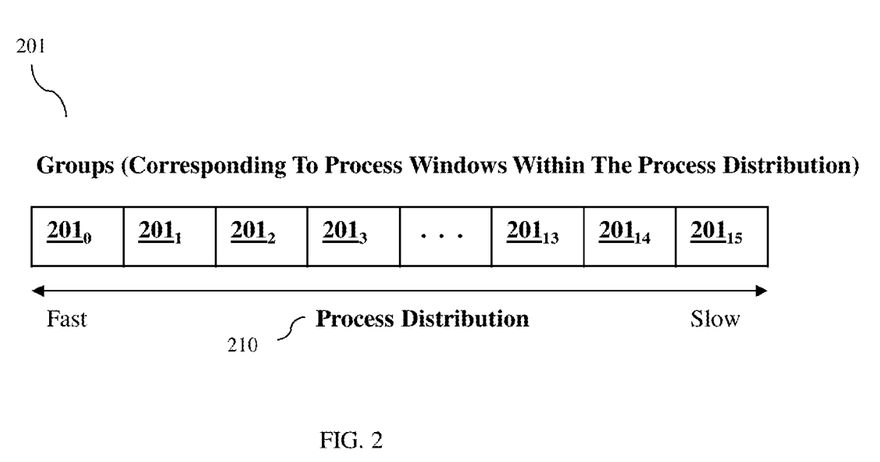
FIG. 2 is drawing illustrating sorting of IC chips into groups corresponding to process windows within a process distribution.

As illustrated in FIG. 2, the process distribution 210 can be divided at process 108 into multiple process windows or, more particularly, multiple successive intervals from the slow end of the process distribution to the fast end of the process distribution and the IC chips can be sorted at process 110 into groups (also referred to herein as bins) that correspond to those process windows. The process windows can be essentially uniform (e.g., can comprise the same number of units of sigma) or non-uniform. The process windows can be symmetric around the distribution center or can be asymmetric relative to the distribution center. For illustration purposes, FIG. 2 shows that the IC chips can be sorted into sixteen discrete groups $201_0$-$201_{15}$, which correspond to sixteen process windows (i.e., sixteen successive intervals across the process distribution 210), respectively. The first group $201_0$ corresponds to the process window with the fastest IC chips in the process distribution 210 and the last group $201_{15}$ corresponds to the process window with the slowest IC chips in the process distribution 210.

Figure 3A:
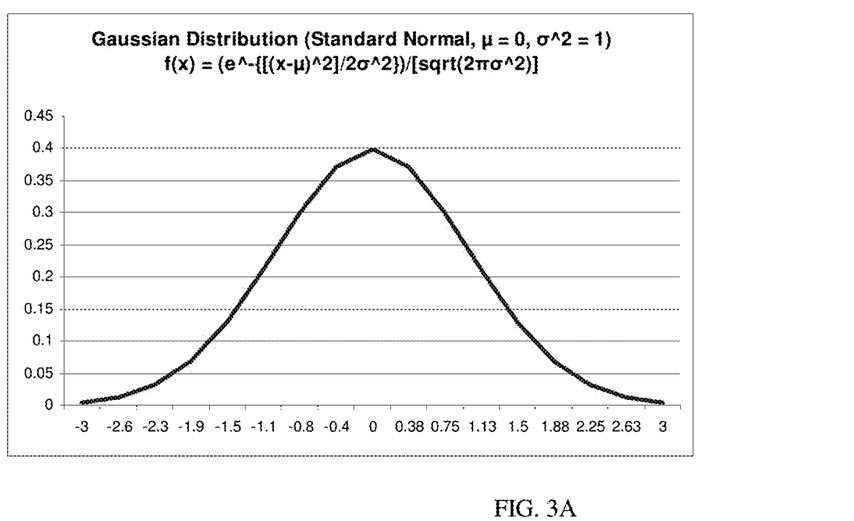
FIG. 3A is a graph illustrating an exemplary process distribution that is a Gaussian distribution.
Figure 3B:
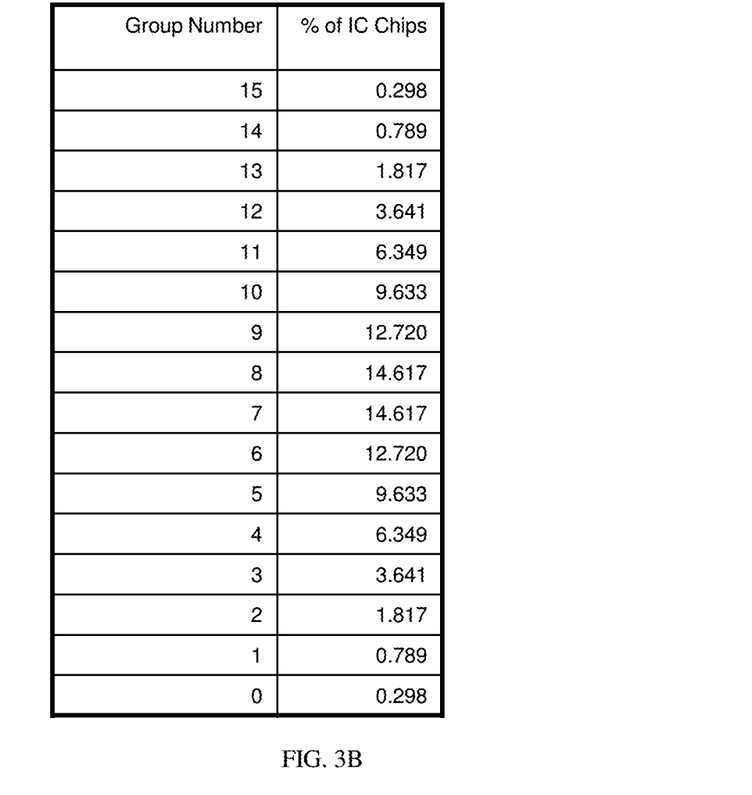
FIG. 3B is a table illustrating groups of IC chips and the percentages of the IC chips in each of the groups, when the process distribution is a Gaussian distribution as in FIG. 3A.

It should be understood that the percentages of the N manufactured IC chips that are sorted into each of the M groups (and, thereby the actual number (n) of IC chips in each of the groups, where the value of n may vary from group to group) will depend on the type of distribution, on the number (M) of process windows, on whether there is uniformity across the process windows (e.g., whether each process window encompasses the same number of units of sigma) and on whether the process windows are symmetric around the distribution center. Thus, for example, for a process distribution 210 that is a Gaussian distribution as illustrated in the graph of FIG. 3A and that is sorted into sixteen different essentially uniform process windows (i.e., the process windows each encompass the same number of units of sigma) that are symmetric around the distribution center, the percentages of the N manufactured IC chips that are sorted into the sixteen different groups $201_0$-$201_{15}$ that correspond to the sixteen process windows, respectively, can be set as shown in the table of FIG. 3B. However, if the process distribution 210 were a statistical distribution other than a Gaussian distribution and/or the number of process windows (and thereby the number of groups) were to differ and/or the number of units of sigma per process window were to differ from process window to process window and/or the symmetry of the process windows relative to the distribution center was to differ, then percentages of the N manufacture IC chips in each of the groups would also differ.

Figure 4:
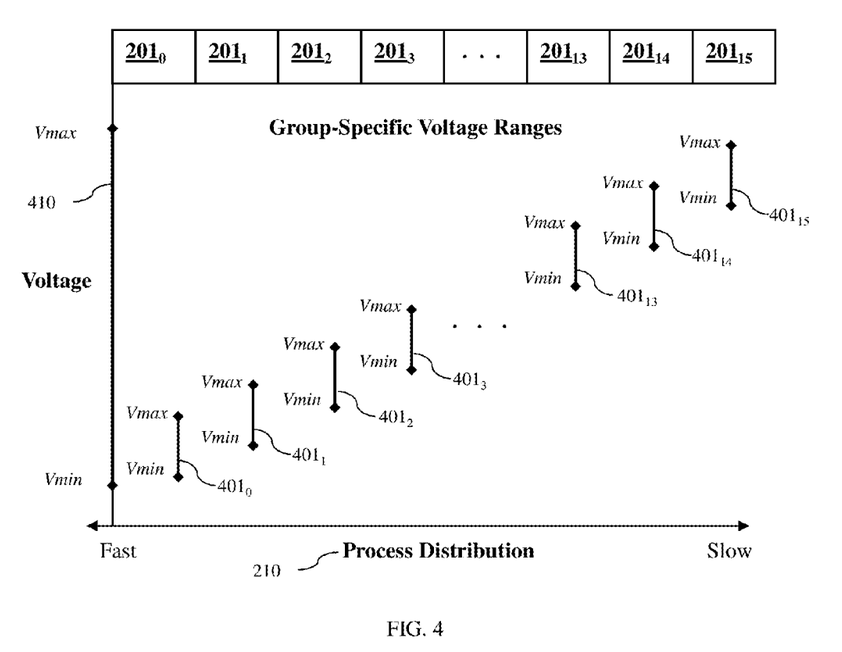
FIG. 4 is a graph illustrating group-specific operating voltage ranges assigned to the groups, respectively.

Optionally, once the IC chips are sorted into the groups $201_0$-$201_{15}$ at process 110, power-optimized selective voltage binning can be performed (112). That is, group-specific operating voltage ranges can be assigned to the different groups $201_0$-$201_{15}$ based on the leakage power measurements acquired at process 106 in order to minimize power consumption of the IC chips within the groups $201_0$-$201_{15}$ and, thereby minimize power consumption of the IC chips across the full process distribution 210. Specifically, as illustrated in FIG. 4, group-specific operating voltage ranges $401_0$-$401_{15}$ can be assigned to the groups $201_0$-$201_{15}$, respectively. Each group-specific operating voltage range $401_0$-$401_{15}$ can be defined by a group-specific minimum voltage (Vmin) and a group-specific maximum voltage (Vmax) and can be within the overall operating voltage range 410 for the process distribution 210. The overall operating voltage range 410 can be a predetermined operating voltage range (i.e., a predetermined minimum operating voltage (Vmin) and a maximum operating voltage (Vmax)) for the specific technology at issue. In any case, the group-specific operating voltage ranges $401_0$-$401_{15}$ can be assigned such that relatively low voltage ranges are assigned to intervals at the "fast" end of the process window 210 in order to minimize the chance of violating a total maximum power constraint. The group-specific voltage ranges $401_0$-$401_{15}$ can further be assigned such that relatively high voltage ranges are assigned to intervals at the "slow" end of the process distribution 210 in order to achieve a specific performance goal (e.g., to increase operating speed). Thus, for example, referring to FIG. 4, the groups $201_0$-$201_{15}$ of IC chips can comprise: a first group $201_0$, which is associated with a first performance range and assigned a first operating voltage range $401_0$; a second group $201_1$, which is associated with a second performance range that is slower than the first performance range and assigned a second operating voltage range $401_1$ that is higher than the first voltage range $401_1$; a third group $201_2$, which is associated with a third performance range that is slower than the second performance range and assigned a third operating voltage range $401_2$ that is higher than the second voltage range, and so on. Various different techniques for defining the process distribution of an IC chip design, for dividing that process distribution into process windows, for sorting IC chips into groups corresponding to process windows and for assigning operating voltage ranges to the groups, as described above, are well known in the art (e.g., see U.S. Pat. No. 8,719,763 of Bickford et al. issued on May 6, 2014 and U.S. Pat. No. 7,475,366 of Kuermerle et al. issued on Jan. 6, 2009, both of which are incorporated herein by reference in their entirety). Thus, the details of such techniques are omitted from this specification in order to allow the reader to focus on the salient aspects of the disclosed method.

Figure 5:
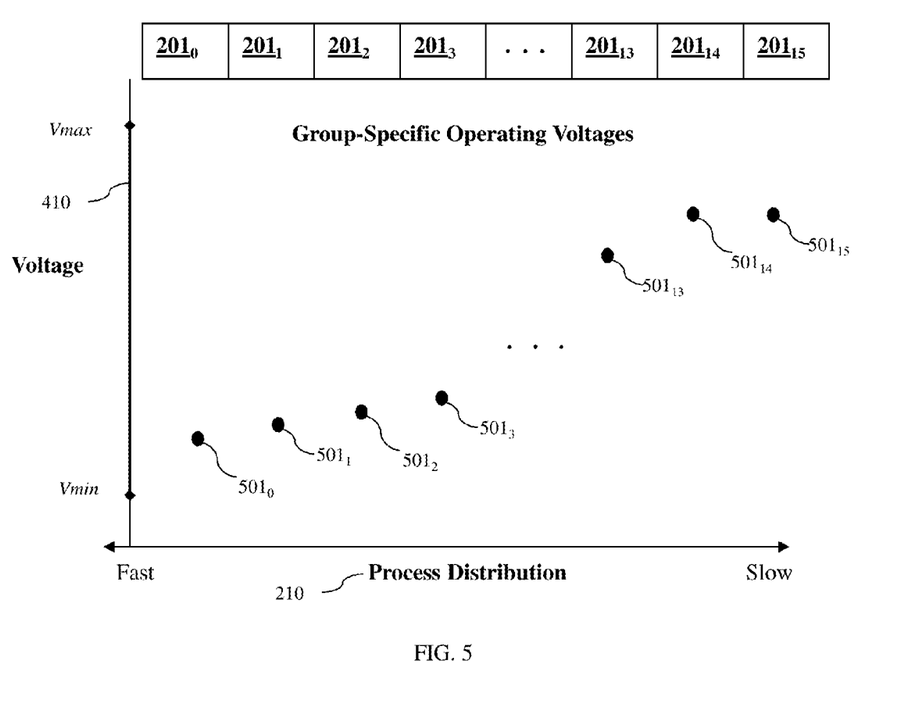
FIG. 5 is a graph illustrating group-specific operating voltages assigned to the groups, respectively.
Figure 6:
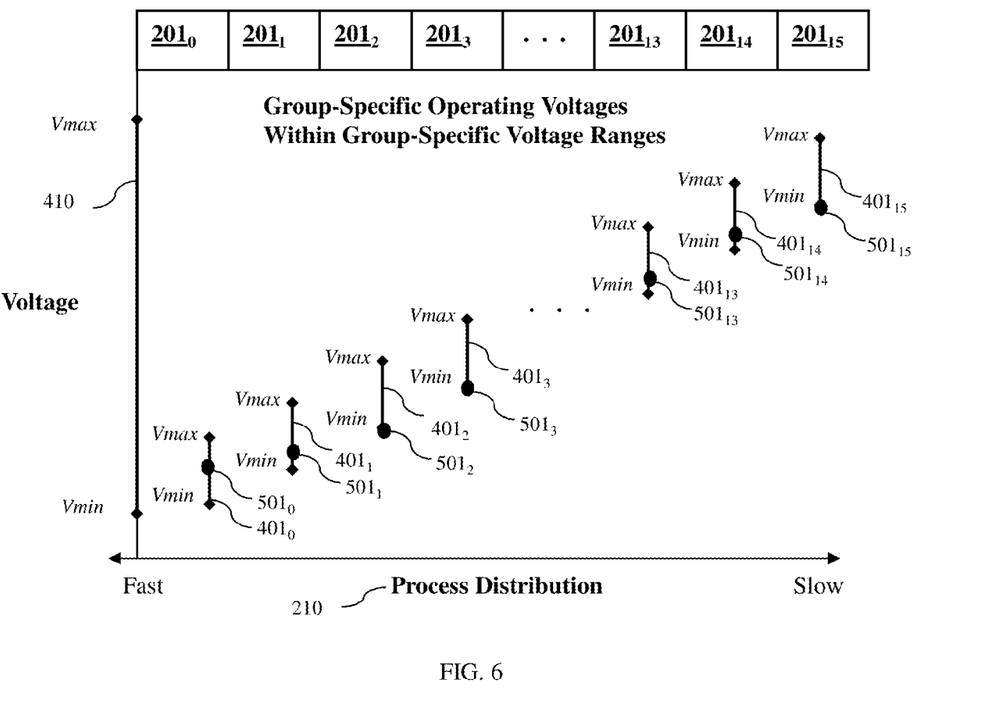
FIG. 6 is a graph illustrating group-specific operating voltages assigned to the groups, respectively, where each group-specific operating voltage is within a previously assigned group-specific operating voltage range.

Subsequently, reliability-optimized selective voltage binning can be performed (114). That is, group-specific operating voltages (also referred to herein as group-specific set-point voltages) can be determined and assigned to the groups $201_0$-$201_{15}$, respectively, in order to optimize reliability of the IC chips within each of the groups $201_0$-$201_{15}$ and, thereby optimize overall reliability of the IC chips across the process distribution 210. Specifically, each group $201_0$-$201_{15}$ can be associated with a specific process window (as discussed above), can comprise a specific portion of the IC chips (e.g., see the table of FIG. 3B that defines the different percentages of the total number (N) of all of the manufactured IC chips within each of the groups $201_0$-$201_{15}$) and can be assigned a group-specific operating voltage $501_0$-$501_{15}$, as illustrated in FIG. 5. Each group-specific operating voltage can be determined and assigned to each group in order to minimize the fail rate of the specific portion of the IC chips contained in that group and thereby optimize the reliability of the specific portion of the IC chips contained in that group (i.e., optimize reliability across the specific process window associated with the specific group). Since the group-specific operating voltages $501_0$-$501_{15}$ are determined and assigned so as to optimize the reliability of the specific portion of the IC chips contained in the specific groups, those group-specific operating voltages $501_0$-$501_{15}$ may vary from group to group. The group-specific operating voltages $501_0$-$501_{15}$ can be appropriate operating voltages, which are determined as described in greater detail below and illustrated in the flow diagram of FIG. 7 and which are at least within the overall operating voltage range 410 (i.e., the minimum operating voltage and maximum operating voltage) associated with the process distribution 210, as shown in FIG. 5. However, if power-optimized selective voltage binning was performed at process 112, then the group-specific operating voltages $501_0$-$501_{15}$ can be appropriate operating voltages, which are determined as described in greater detail below and illustrated in the flow diagram of FIG. 7 and which are within the previously assigned group-specific operating voltage ranges $401_0$-$401_{15}$, respectively, as shown in FIG. 6.

Figure 7:
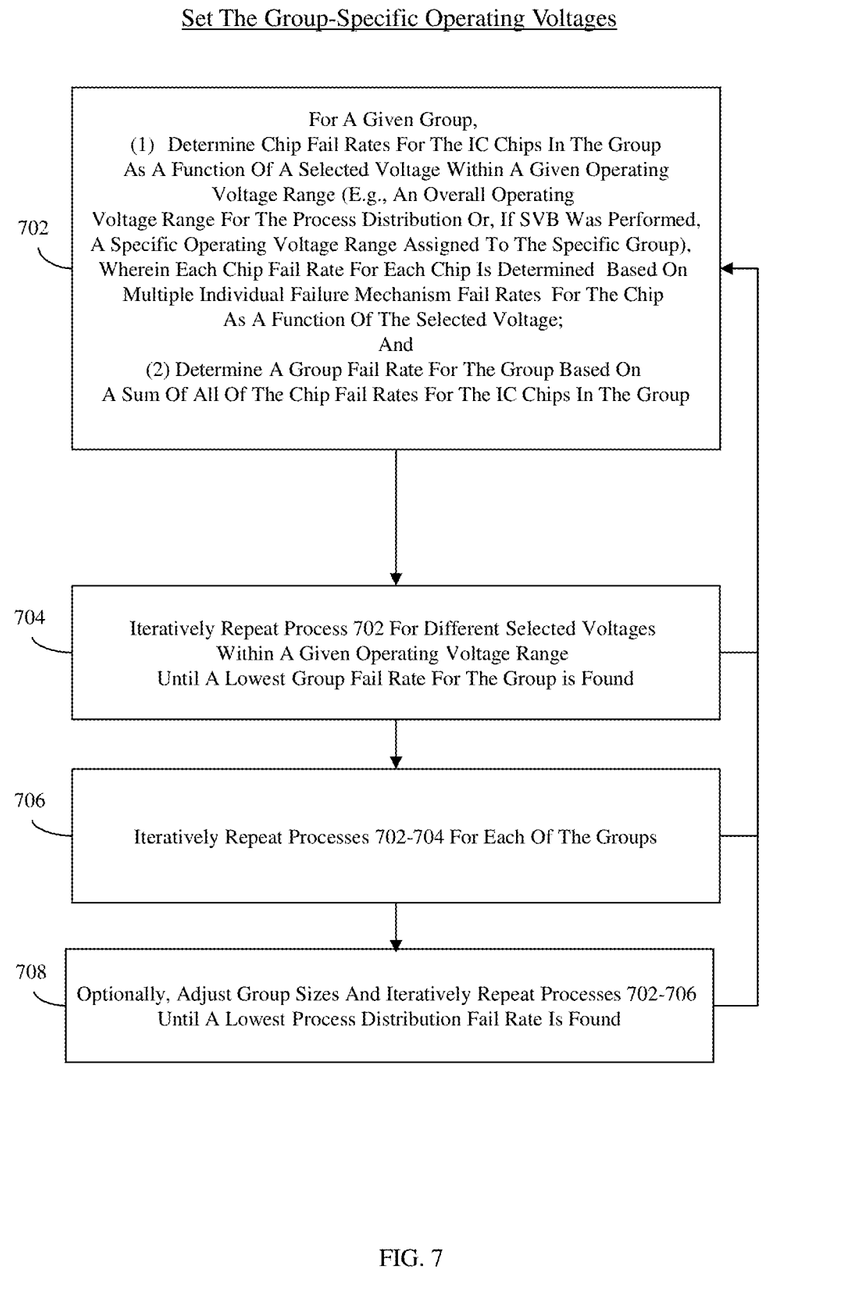
FIG. 7 is a flow diagram further illustrating process 114 of FIG. 1.

The process steps used determining the group-specific operating voltages $501_0$-$501_{15}$ that are to be assigned to the groups $201_0$-$201_{15}$, respectively, at process 114 are illustrated in the flow diagram of FIG. 7. To find the group-specific operating voltages $501_0$-$501_{15}$ the following process steps can be performed with respect to each group. For each group, chip fail rates for the IC chips in the group can be determined as a function of a selected voltage within a given operating voltage range and, based on the sum of all of these chip fail rates as well as the number (n) of IC chips contained in the group, a group fail rate for the group can be determined (702). The selected voltage can be within the given operating voltage range at issue. For example, the selected voltage can be within the overall operating voltage range associated with the process distribution or, if power-optimized selective voltage binning was performed at process 112, it can be within the group-specific operating voltage range associated with the group. In any case, the selected voltage can be the minimum operating voltage associated with the given operating voltage range at issue, the maximum operating voltage associated with the given operating voltage at issue, or some other selected voltage within the given operating voltage range at issue. In any case, each chip fail rate for each chip can be calculated at process 702 based on multiple individual failure mechanism fail rates for the chip (i.e., fail rates associated with any one or more of the failure mechanisms including any of time-dependent dielectric breakdown (TDDB) of the gate dielectric layer or between metal lines, hot carrier injection (HCI), negative bias temperature instability (NBTI), positive bias temperature instability (PBTI), soft error rate (SER), retention disturbance, stress-induced voiding (SIV), electromigration (EM) or any other failure mechanism on the chip).

Specifically, each chip fail rate can be calculated using the following expression:

$$F_i[V_j]=1-\Pi_k(1-f_k[B_j]), \quad (1)$$

where $F_i[V_j]$ represents the chip fail rate of one of the integrated circuit chips (i) in one of the groups (j) as a function of the selected voltage for that group j, where $f_k[V_j]$ represents one of the individual failure mechanism fail rates (i.e., the fail rate associated with a single one of the failure mechanisms (k) as a function of the selected voltage and where $\Pi_k(1-f_k[V_j])$ represents the Cartesian product of $1-f_k[V_j]$ for all of the different failure mechanisms at issue (e.g., $(1-f_{TDDB}[V_j])*(1-f_{HCI}[V_j])*(1-f_{NBTI}[V_j])* \ldots *(1-f_{SM}[V_j])*(1|f_{EM}[V_j]))$. It should be noted that the individual failure mechanism fail rates can be determined using a reliability simulator. That is, a reliability simulator can be used to generate models of each of the failure mechanisms as a function of the specific process window associated with the specific group. Based on these models, failure mechanism fail rates can be set for the failure mechanisms, respectively, as a function of the specific process window.

Next, the group-specific group fail rate for each group can then be determined at process 702 using the following expression:

$$F_j[V_j]=1/n\Sigma_i F_i[V_j], \quad (2)$$

where $F_j[V_j]$ represents the group-specific group fail rate as a function of the selected voltage for the group j, n represents the number of IC chips within that group j, and where $\Sigma_i F_i[V_j]$ represents the sum of all the chip fail rates $F_i[V_j]$ for each of the integrated circuit chips (i) in the group j.

For each group j, process step 702 can be iteratively repeated using multiple different selected voltages within the given operating voltage range at issue until the lowest group fail rate for that group is found (i.e., until a specific one of the different selected voltages that achieves a lowest group fail rate for that group is identified) (704). The specific selected voltage that is used when the lowest group fail rate is found can be assigned as the group-specific operating voltage for the group.

More specifically, as mentioned above, some failure mechanisms, such as the BTI and HCI failure mechanisms, have a higher fail rate at the slow end of the process distribution, some failure mechanisms, such as the TDDB and EM failure mechanisms, have a higher fail rate at the fast end of the process distribution, and other failure mechanisms, such as SIV have an essentially constant fail rate across the process distribution. Each time a different selected operating voltage is used at process 702, the corresponding change in operating speed will have a different impact on each of the different individual failure mechanisms that operate on each of the IC chips. For example, the corresponding change in operating speed may increase the fail rates associated with some failure mechanisms, decrease the fail rates associated with other failure mechanisms, and/or cause no change in the fail rate of other failure mechanism. Furthermore, for those failure mechanisms that have fail rates that vary from process window to process window, the rate of change may differ (e.g., for one failure mechanism the rate of change may be relatively small and for another failure mechanism the rate of change may be exponential). Equation (1) can be used to determine which of the different selected voltages achieves the lowest group fail rate (i.e., the best group reliability) given how each of the individual failure mechanism fail rates on each chip impacts the chip fail rates and, thereby the group fail rate.

Processes 702-704 can be iteratively repeated for each group j (706). Then, the overall fail rate for the process distribution can be calculated using the following expression:

$$F_{PD} = \Sigma_j(p_j * F_j[V_j]),\quad(3)$$

where $F_{PD}$ represents the process distribution fail rate (i.e., the combined fail rate for all of the groups in the process distribution), where $p_j$ represents the percentage of the total number (N) of IC chips within a group, where $p_j * F_j[V_j]$ represents the contribution of a particular group fail rate to the overall fail rate of the process distribution, and where $\Sigma_j(p_j * F_j[V_j])$ is the sum of those contributions. By finding the lowest group fail rate for each group, the processes described above necessarily find the lowest process distribution fail rate at process 706, given the number (M) of process windows (and thereby the number of groups) and the sizes of the groups (i.e., the number (n) of IC chips in each group, where the value of n may vary from group to group).

Optionally, the group sizes (i.e., the number (n) of IC chips in each group, where the value of n varies from group to group) and, particularly, the percentages of the total number (N) of the manufactured IC chips within the different groups, respectively (i.e., the $p_j$ values for each of the groups) can be selectively adjusted and processes 702-706 can be iteratively repeated until the lowest process distribution fail rate is found (708). More specifically, as mentioned above, the overall process distribution fail rate depends on the percentages ($p_j$) of the N manufactured IC chips that are sorted into each of the M groups. Since the overall process distribution fail rate depends on the percentages ($p_j$) of the N manufactured IC chips that are sorted into each of the M groups, these percentages can be selectively adjusted and the processes 702-706 can be iteratively repeated in order to lower the overall process distribution fail rate. That is, the percentages ($p_j$) of the N manufactured IC chips that are sorted into each of the M groups can be selectively adjusted, for example, by selectively adjusting the group sizes (i.e., the number (n) of IC chips within each group, where the value of n varies from group to group) and/or by selectively adjusting the number of groups in order to find the optimal group sizes and/or the optimal number of groups to achieve the lowest overall process distribution fail rate at process 708.

Referring again to FIG. 1 in combination with FIG. 5 or FIG. 6, after reliability-optimized selective voltage binning is performed at process 114, additional steps 116a or 116b can be performed to ensure that system designers and operators can gain access to the group-specific operating voltages and, if power-optimized selective voltage binning was performed at process 112, to the group-specific operating voltage ranges.

Figure 8:
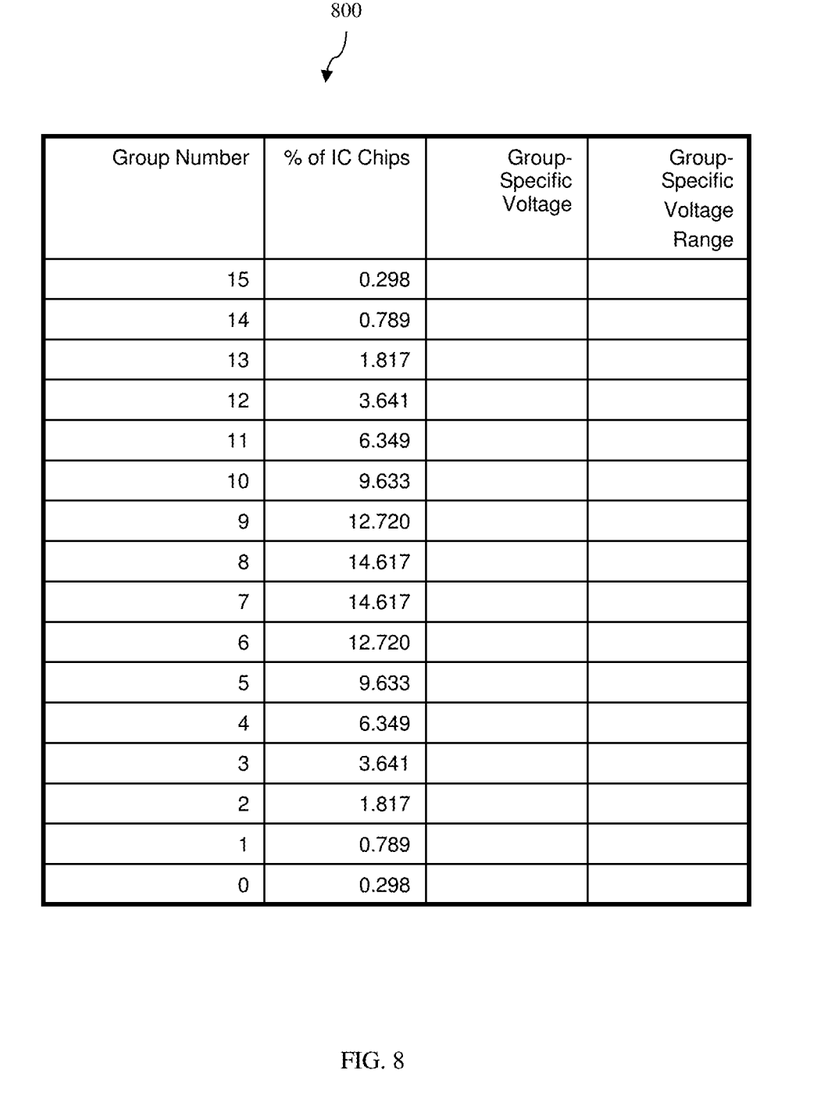
FIG. 8 is an exemplary look-up table associating the groups with corresponding identifiers, group-specific operating voltages and, optionally, group-specific operating voltage ranges; and, FIG. 9 is a schematic diagram illustrating an exemplary computer system for implementing aspects of the disclosed method.

For example, at process 116a, a look-up table (LUT) can be created. Specifically, as illustrated in FIG. 8, a look-up table 800 can be created that associates the groups with corresponding identifiers (e.g., group numbers) and that further associates the corresponding identifiers with the group-specific operating voltages, respectively. If power-optimized selective voltage binning was performed at process 112, the LUT 800 can further associate the corresponding identifiers with group-specific operating voltage ranges, as illustrated. Additionally, the manufactured IC chips can comprise programmable group identifier bits. The group identifier bits on each IC chip can be programmed to indicate the group number of the group from which the IC chip was selected. During system design and/or operation, the group identifier bits of an IC chip can be read and the LUT can be accessed from memory to determine the group-specific operating voltage and, thereby the reliability-optimized operating voltage that should be used during system operation and, if applicable, the group-specific operating voltage range and, thereby the power-optimized operating voltage range that can be used during system operation (118).

Alternatively, at process 116b, the manufactured IC chips comprise programmable reliability-optimized operating voltage bits and programmable power-optimized operating voltage range bits. The programmable reliability-optimized operating voltage bits on each IC chip can be programmed to indicate the group-specific operating voltage assigned to the group from which the IC chip was selected. The programmable power-optimized operating voltage range bits on each IC chip can, if reliability-optimized selective voltage binning was performed at process 114, be programmed to indicate the group-specific operating voltage range assigned to the group from which the IC chip was selected. During system design and/or operation, these programmable bits can be read and used to determine the group-specific operating voltage and, thereby the reliability-optimized operating voltage that should be used during system operation and, if applicable, the group-specific operating voltage range and, thereby the power-optimized operating voltage range that can be used during system operation.

The on-chip programmable bits referred to above can comprise, for example, one-time programmable bits. One-time programmable bits comprise devices that, once programmed (i.e., once written to), cannot be re-programmed. Exemplary one-time programmable bits include, but are not limited to, fuses, anti-fuses or any other suitable one-time programmable bits. Those skilled in the art will recognize that in the case of a fuse such one-time programming involves blowing the fuse (i.e., breaking the electrical connection in the fuse), thereby changing the value of the fuse, when read, from a first value (e.g., a high or "1" value) to a second value (e.g., a low or "0" value). Contrarily, in the case of an anti-fuse such on-time programming involves breaking down dielectric material in the anti-fuse to establish an electrical connection, thereby changing the value of the anti-fuse, when read, from a first value (e.g., a low or "0" value) to a second value (e.g., a high or "1" value). In any case, the binary values can be used to represent the group identifier information or, alternatively, the operating voltage and voltage range information discussed above.

The embodiments of the method as described above can be used in the fabrication of IC chips (e.g., IC chips the above-described programmable bits). The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Aspects of the disclosed method embodiments (e.g., processes used when determining the group-specific operating voltage ranges during power-optimized selective voltage binning and/or processes used when determining the group-specific operating voltages during reliability-optimized selective voltage binning) can be implemented using a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
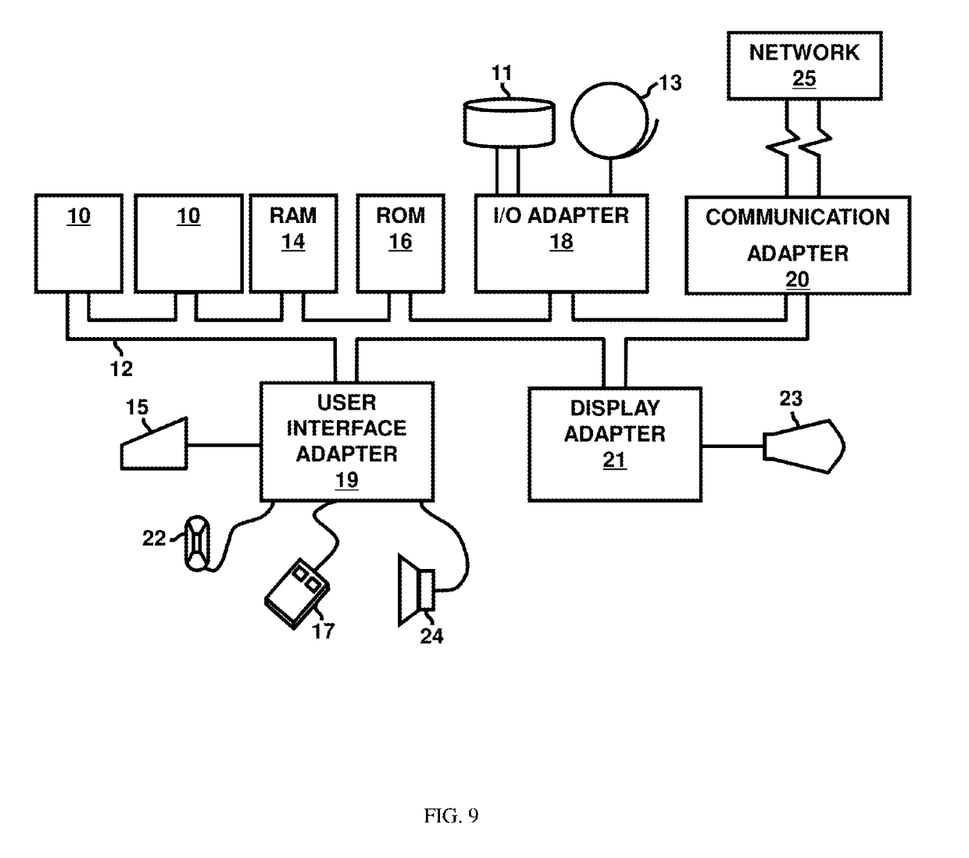

A representative hardware environment (i.e., a computer system) for implementing aspects of the method embodiments, as described above, is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

Therefore, disclosed above are embodiments of a method for improving integrated circuit (IC) chip reliability through reliability-optimized selective voltage binning. In the embodiments, IC chips, which are manufactured according to a given IC chip design, can be sorted into different groups associated with different process windows within a process distribution for the design. Subsequently different operating voltages can be assigned to the different groups, respectively, in order to optimize overall reliability of the IC chips across the process distribution. That is, each group can be associated with one of the process windows, can comprise a specific portion of the IC chips and can be assigned a group-specific operating voltage that minimizes the group fail rate (i.e., the fail rate of the specific portion of the IC chips contained in the group) and that, thereby optimizes the reliability of the specific portion of the IC chips contained in the group (i.e., optimizes reliability across the process window). The group-specific operating voltage assigned can be within minimum and maximum voltages associated with either the process distribution or the process window associated with the group (e.g., following power-optimized selective voltage binning). Optionally, the reliability across the process distribution can be optimized by a combination of both assigning the appropriate operating voltage, as discussed above, and adjusting group size.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    sorting integrated circuit chips manufactured according to a design into groups, said groups being associated with different process windows of a process distribution for said design;
    determining group-specific operating voltages to be assigned to said groups, said determining comprising, for each group:
        identifying a specific selected voltage that achieves a lowest group fail rate; and
        using said specific selected voltage as a group-specific operating voltage for said group; and
    assigning said group-specific operating voltages to said groups to optimize overall reliability of said integrated circuit chips across said process distribution,
    said reliability being based on said group fail rate, and
    each group being associated with one of said process windows, comprising a specific portion of said integrated circuit chips and being assigned a group-specific operating voltage that optimizes reliability of said specific portion of said integrated circuit chips.

2. The method of claim 1, said group-specific operating voltages being within a minimum voltage and a maximum voltage associated with said process distribution.

3. The method of claim 1, said determining said group-specific operating voltages to be assigned to said groups further comprising, for each group:
determining a group fail rate as a function of a selected voltage; and
iteratively repeating said determining of said group fail rate using different selected voltages.

4. The method of claim 3,
said group fail rate being determined as a sum of chip fail rates of integrated circuit chips within said group divided by a number of said integrated circuit chips in said group, and
each chip fail rate being determined based on multiple failure mechanism fail rates.

5. The method of claim 1, said group-specific operating voltages varying between said groups.

6. The method of claim 1, further comprising:
programming each integrated circuit chip in said group with an identifier associated with said group; and,
creating a look-up table that associates said identifier with said group-specific operating voltage.

7. The method of claim 1, further comprising programming each integrated circuit chip in said group with said group-specific operating voltage.

8. A method comprising:
sorting integrated circuit chips manufactured according to a design into groups, said groups being associated with different process windows of a process distribution for said design;
determining group-specific operating voltage ranges to be assigned to said groups, said determining comprising, for each group:
identifying a specific selected voltage range that achieves a lowest group fail rate; and
using said specific selected voltage range as a group-specific operating voltage range for said group;
measuring leakage power of said integrated circuit chips to produce leakage power measurements; and
assigning said group-specific operating voltage ranges to said groups to minimize power consumption of said integrated circuit chips across said process distribution, said power consumption being based on said leakage power measurements; and
assigning group-specific operating voltages to said groups to optimize overall reliability of said integrated circuit chips across said process distribution, said reliability being based on said group fail rate, and
each group being associated with one of said process windows, comprising a specific portion of said integrated circuit chips and being assigned a group-specific operating voltage that optimizes reliability of said specific portion of said integrated circuit chips, said group-specific operating voltage being within a group-specific operating voltage range previously assigned to said group.

9. The method of claim 8, said group-specific operating voltage ranges comprising group-specific minimum and maximum voltages within a minimum voltage and a maximum voltage associated with said process distribution.

10. The method of claim 8, said determining said group-specific operating voltage ranges to be assigned to said groups further comprising, for each group:
determining a group fail rate as a function of a selected voltage range; and
iteratively repeating said determining of said group fail rate using different selected voltage ranges.

11. The method of claim 10,
said group fail rate being determined as a sum of chip fail rates of integrated circuit chips within said group divided by a number of said integrated circuit chips in said group, and
each chip fail rate being determined based on multiple failure mechanism fail rates.

12. The method of claim 8, said group-specific operating voltage ranges varying between said groups.

13. The method of claim 8, further comprising:
programming each integrated circuit chip in said group with an identifier associated with said group; and,
creating a look-up table that associates said identifier with said group-specific operating voltage.

14. The method of claim 8, further comprising programming each integrated circuit chip in said group with said group-specific operating voltage range.

15. A method comprising:
sorting integrated circuit chips manufactured according to a design into groups, said groups being associated with process windows of a process distribution for said design;
determining group-specific operating voltages to be assigned to said groups, said determining comprising, for each group:
identifying a specific selected voltage that achieves a lowest group fail rate; and
using said specific selected voltage as a group-specific operating voltage for said group; and
assigning said group-specific operating voltages to said groups and adjusting sizes of said groups so as to optimize overall reliability of said integrated circuit chips across said process distribution,
said reliability being based on said group fail rate, and
each group being associated with one of said process windows, comprising a specific portion of said integrated circuit chips and being assigned a group-specific operating voltage that optimizes reliability of said specific portion of said integrated circuit chips.

16. The method of claim 15, said group-specific operating voltages being within a minimum voltage and a maximum voltage associated with said process distribution.

17. The method of claim 15, said determining said group-specific operating voltages to be assigned to said groups further comprising, for each group:
determining a group fail rate as a function of a selected voltage; and
iteratively repeating said determining of said group fail rate using different selected voltages.

18. The method of claim 17, said group fail rate being determined as a sum of chip fail rates of integrated circuit chips within said group divided by a number of said integrated circuit chips in said group, and
each chip fail rate being determined based on multiple failure mechanism fail rates.

19. The method of claim 15, further comprising:
programming each integrated circuit chip in said group with an identifier associated with said group; and,
creating and storing in memory a look-up table that associates said identifier with said group-specific operating voltage.

20. The method of claim 15, further comprising programming each integrated circuit chip in said group with said group-specific operating voltage.

* * * * *